(12) United States Patent
Symonds et al.

(10) Patent No.: US 8,863,738 B2
(45) Date of Patent: Oct. 21, 2014

(54) POOL HEATING DEVICE SYSTEM

(71) Applicant: Donald C. Symonds, Grand Ledge, MI (US)

(72) Inventors: Donald C. Symonds, Grand Ledge, MI (US); Bruce C. Nemec, Madison, WI (US); Jason Rohr, Palmyra, WI (US)

(73) Assignee: Donald C. Symonds, Grand Ledge, MI (US)

( * ) Notice: Subject to any disclaimer, the term of this patent is extended or adjusted under 35 U.S.C. 154(b) by 0 days.

(21) Appl. No.: 13/650,868

(22) Filed: Oct. 12, 2012

(65) Prior Publication Data

US 2013/0092151 A1   Apr. 18, 2013

Related U.S. Application Data

(60) Provisional application No. 61/548,043, filed on Oct. 17, 2011.

(51) Int. Cl.
*F24J 2/42* (2006.01)
*E04H 4/12* (2006.01)
*E04H 4/14* (2006.01)

(52) U.S. Cl.
CPC .............. *E04H 4/129* (2013.01); *E04H 4/1209* (2013.01); *E04H 4/14* (2013.01)
USPC ........... 126/561; 126/563; 126/565; 126/566; 126/595; 239/25

(58) Field of Classification Search
USPC ............. 126/561, 563, 565, 566, 595; 239/25
See application file for complete search history.

(56) References Cited

U.S. PATENT DOCUMENTS 1,968,391 A * 7/1934 Hamilton ...................... 239/394
3,368,546 A   2/1968 Wade
(Continued)

FOREIGN PATENT DOCUMENTS

RU   14076 U1   6/2000
RU   44798 U1   3/2005

OTHER PUBLICATIONS

Roy W. Spencer, "The spencer's Swimming Pool Goes Solar", http://www.drroyspencer.com/2010/04/the-spencers-swimming-pool-goes-solar/, Apr. 14, 2010.*

(Continued)

*Primary Examiner* — Kenneth Rinehart
*Assistant Examiner* — Gajanan M Prabhu
(74) *Attorney, Agent, or Firm* — Gifford, Krass, Sprinkle, Anderson & Citkowski, P.C.; Douglas L. Wathen (57) ABSTRACT

A system for heating a pool of water is provided. An inlet is provided for liquid to be delivered to the pool of water. The system includes an attachment apparatus having a body defining a fluid passageway from a first opening to a second opening. A third opening is disposed between the first and second opening. The attachment connects to the inlet for receiving the liquid. An adjustable diverging mechanism is mounted to the attachment operable to redirect flow out of the third opening. A tube having a flow channel and thermally conductive outer surface is coupled to the third opening and extends out of the pool to be exposed to environmental conditions and absorb thermal energy. The liquid passing through the flow channel of the tube returns to the pool of liquid and heated when passing through the tube prior to returning to the pool.

19 Claims, 5 Drawing Sheets

(56) References Cited

U.S. PATENT DOCUMENTS

| | | | |
|---|---|---|---|
| 3,411,163 A | 11/1968 | Myers, Jr. | |
| 4,082,081 A | 4/1978 | McColgan | |
| 4,085,732 A | 4/1978 | Hysom | |
| 4,146,015 A | 3/1979 | Acker | |
| 4,312,323 A | 1/1982 | Domenech | |
| 4,406,278 A * | 9/1983 | Demmer | 126/563 |
| 4,505,702 A * | 3/1985 | Peery et al. | 604/209 |
| 5,141,498 A | 8/1992 | Christian | |
| 5,201,857 A | 4/1993 | Nix | |
| 5,208,923 A | 5/1993 | Stiver | |
| 5,347,984 A | 9/1994 | Klaren | |
| 5,586,548 A | 12/1996 | Hsia | |
| 5,893,341 A | 4/1999 | Cox | |
| 6,497,814 B1 * | 12/2002 | Alexander et al. | 210/108 |
| 6,503,241 B1 * | 1/2003 | Barkdoll | 4/496 |
| 6,526,965 B1 | 3/2003 | Devore | |
| 6,695,970 B2 | 2/2004 | Hornsby | |
| 7,849,877 B2 * | 12/2010 | Tan et al. | 137/625.46 |
| 8,281,814 B2 * | 10/2012 | Kim | 137/637.3 |
| 8,370,001 B2 * | 2/2013 | Love | 700/300 |
| 2005/0066433 A1 | 3/2005 | Phillips | |
| 2008/0210309 A1 | 9/2008 | Tan | |
| 2009/0095353 A1 | 4/2009 | Arsin | |
| 2011/0030135 A1 | 2/2011 | Riley | |

OTHER PUBLICATIONS

International Search Report and Written Opinion for co-pending PCT application Serial No. PCT/US2013/064520, issued Feb. 6, 2014.

\* cited by examiner

POOL HEATING DEVICE SYSTEM

CROSS-REFERENCE TO RELATED APPLICATION

This application claims the priority benefit of U.S. Provisional Application No. 61/548,043 filed Oct. 17, 2011, the disclosure of which is hereby incorporated herein by reference in its entirety.

BACKGROUND

The present disclosure relates generally to a pool heating system and particularly to a system with an attachment device for mounting in a swimming pool having a flow diverging valve.

DESCRIPTION OF THE RELATED ART

Swimming pools are heated for several reasons including extending the swimming season to earlier in the spring and later in the fall and further to provide more comfortable water temperatures throughout the swimming season. Pool heating can be conducted with several types of heating systems involving circulating pool water through an electric or gas-fired water heating system. This type of heating relies on utility services and significantly increases electric and/or gas costs. Moreover, implementation, upkeep, and operation can further increase costs. This can have a residual deterring effect of preventing pool usage or pool ownership.

A further type of heating system uses floating panels through which water is circulated, the panels being heated by the sun. Another type of pool cover for heating pools consists of a floating structure containing channels for flow of water therethrough. The floating structure is heated by the sun which in turn heats the water flowing through the channels. These systems require time and labor and restrict pool usage during operation.

Despite the variety of pool heating devices available, there continues to be a need for a simple economical pool heating system which is easily adaptable to various size pools and which does not require the expensive implementation and operational costs associated with utility-based systems such as electric or gas heating. There is also a need for a pool heating device that does not consume precious natural resources or that adds pollutants to the environment. Moreover, a need exists for a system that does not significantly restrict pool usage during operation or demand a significant amount of labor and time by the user to implement and operate. Such a device should be relatively inexpensive to own and operate yet be effective to sufficiently heat swimming pool water.

SUMMARY

The present disclosure relates to a system to operate in cooperation with a pool of liquid having an inlet for liquid to be delivered to the pool of liquid. The system is provided for heating the liquid and includes: (a) an attachment apparatus having a main body defining a fluid passageway from a first opening to a second opening, and a third opening disposed between the first and second opening, wherein the attachment connects to the inlet for receiving the liquid; (b) an adjustable diverging mechanism mounted to the attachment operable to redirect flow out of the third opening; and (c) a tube having flow channel a thermally conductive outer surface, the tube coupled to the third opening and extending out of the body of liquid and exposed to environmental conditions to absorb thermal energy and be heated. The liquid is heated when passing through the flow channel of the tube and then returned to the pool of liquid.

In an example, the pool of liquid is a swimming pool having at least one retaining wall and the inlet is defined on the retaining wall. The tube can be fabricated from a member selected from the group consisting of a flexible polymer or rubber-based tube. In a further example, the tube is a garden hose. The thermal energy can include solar radiation. In yet a further example, the system is operable to increasing the temperature of the pool of liquid between about 10 degrees and 50 degrees. In yet a further example, the system is operable to increasing the temperature of the pool of liquid between about 20 degrees and 40 degrees in a time between about 48 and 96 hours. In yet an even further example, activating the diverging mechanism is automated and responsive to a thermal sensor wherein the diverging mechanism will open or close if the pool of water reaches or drops below a predetermined fluid temperature. The inlet can be coupled to a fluid filtering system adapted to draw the liquid from the pool of liquid with a pump, filter the liquid by substantially removing contaminants and undesired items found in the liquid and delivering the filtered liquid back to the pool of liquid through the inlet.

The present disclosure further relates to an attachment apparatus for heating liquid, the attachment apparatus including: (a) a body having a fluid passageway from a first opening to a second opening; (b) a third opening provided on the body between the first and second opening to allow liquid to exit the body; and (c) an adjustable diverging mechanism mounted to the attachment operable to split liquid flowing through the body and redirect at least some of the flow out of the third opening. The first opening is shaped and sized to mount to an inlet of a pool of liquid and the third opening is adapted to connect to a tube having a thermally conductive outer surface. The tube extends out of the pool of liquid to be exposed to environmental conditions to absorb thermal energy and heat the liquid prior to returning the liquid to the pool of liquid. In an example, the body of the attachment defines an elongated tubular geometry and the diverging mechanism is provided within the fluid passageway internal to the tubular body. In another example, the diverging mechanism includes an internal flow splitter adjustable with a turn knob positioned external to the fluid passageway. The flow splitter can be a ball valve.

In yet a further example, the diverging mechanism includes an adjustable flow restrictor cap mounted over the second opening having a stationary plate provided between the second opening and the restrictor cap. The restrictor cap and the stationary plate can each define at least one aligned opening to allow liquid to flow out of the attachment apparatus and wall restriction portions that restrict liquid from exiting the second opening. The restrictor cap is adjustable to restrict liquid flow out of the second opening when rotated to block the openings formed in each of the restrictor cap and the stationary plate causing a back pressure to redirect the liquid out through the third opening. The body of the apparatus can include a flow restriction indicator provided on an outer surface of the apparatus body and cooperate with a flow indicator fin formed on an outer surface of the cap.

The present disclosure further provides for a method of heating a pool of liquid, the method including the steps of: (a) connecting a first opening of an attachment apparatus to an inlet of the pool of liquid for receiving liquid, the attachment apparatus having a body defining a fluid passageway from the first opening to a second opening, and a third opening disposed between the first and second opening, and an adjustable diverging mechanism mounted to the attachment operable to redirect flow out of the third opening; (b) connecting a tube defining a fluid passageway to the third opening, the tube having a thermally conductive outer surface and extending out of the pool of liquid to be exposed to environmental conditions to absorb thermal energy and be heated; (c) adjusting the diverging mechanism to divert liquid flow through the third opening and the tube to absorb heat from the heated tube; and (d) redirecting the heated liquid back into the pool of liquid.

Other features and advantages of the present disclosure will be readily appreciated, as the same becomes better understood after reading the subsequent description taken in conjunction with the accompanying drawings.

DESCRIPTION

The present disclosure provides for a system, apparatus, and method for heating a swimming pool. Although the examples refer to a swimming pool, it is understood that the system of the present disclosure is applicable to any "body of liquid" and the term "pool" or "pool of liquid" are used interchangeable with such bodies of liquid for illustrative purposes. Examples of other bodies of liquid include but are not limited to ponds, aquariums, lakes, holding tanks, and the like including man-made lakes and ponds. Reference may further be made to "body of water" which is understood to be interchangeable with the terms "body of fluid" or "body of liquid". Likewise, the term "water" also is used interchangeably with "liquid."

In an example, a body of water is contained within a pool having at least one retaining wall and a fluid inlet defined somewhere along the wall. The liquid inlet delivers fluid to the pool from an external source. In the following examples, the external source is a pool water filtering system that pulls water from the pool using a pump, filters the water to remove undesired items and contaminants, and then delivers the filtered water back to the pool through the filtered water inlet or return opening. It is understood that the terms "pool water" are general terms that refer to a liquid that includes water and may include other chemicals or fluids. The "return opening" can be referred to as an "inlet" and the fluid can be delivered by any known means. Although reference is made to a "filtering system," a pump drawing the water from the pool and returning the water through the return opening is also contemplated even if no filter is used.

The heating system of the present disclosure is adapted to function in combination with a pool, particularly a swimming pool, that includes a water inlet or return opening formed on a retaining wall. Typically the inlet opening is submerged underwater. The system includes attaching an attachment apparatus, generally having a main body and a diverging valve therein that directs pool water through a tube-like structure whereby the water is heated by external thermal energy before reentering the pool. The attachment can be characterized as a flow-splitting apparatus. The apparatus can include an pipe body having a first opening acting as an inlet for water, which is typically delivered from a pool pump. A second opening is formed at or near the opposite end of the main body allowing water to exit into the pool. An adjustable diverging valve, which may also be referred to as a flow-splitting valve or resistance valve, is positioned within the body or at the second opening. By adjusting the valve to generate resistance, a portion of the water flowing through the body of the apparatus can be diverted into a third opening. The third opening connects the body of the attachment to a hose or some other suitable tube-like structure that extends outside of the pool and is exposed to environmental conditions, particularly sunlight. As the pool water travels through the tube, it is heated by solar energy to a higher temperature. The distal outlet of the tube is then directed back toward the pool allowing the relatively warmer water to reenter the pool.

Figure 1:
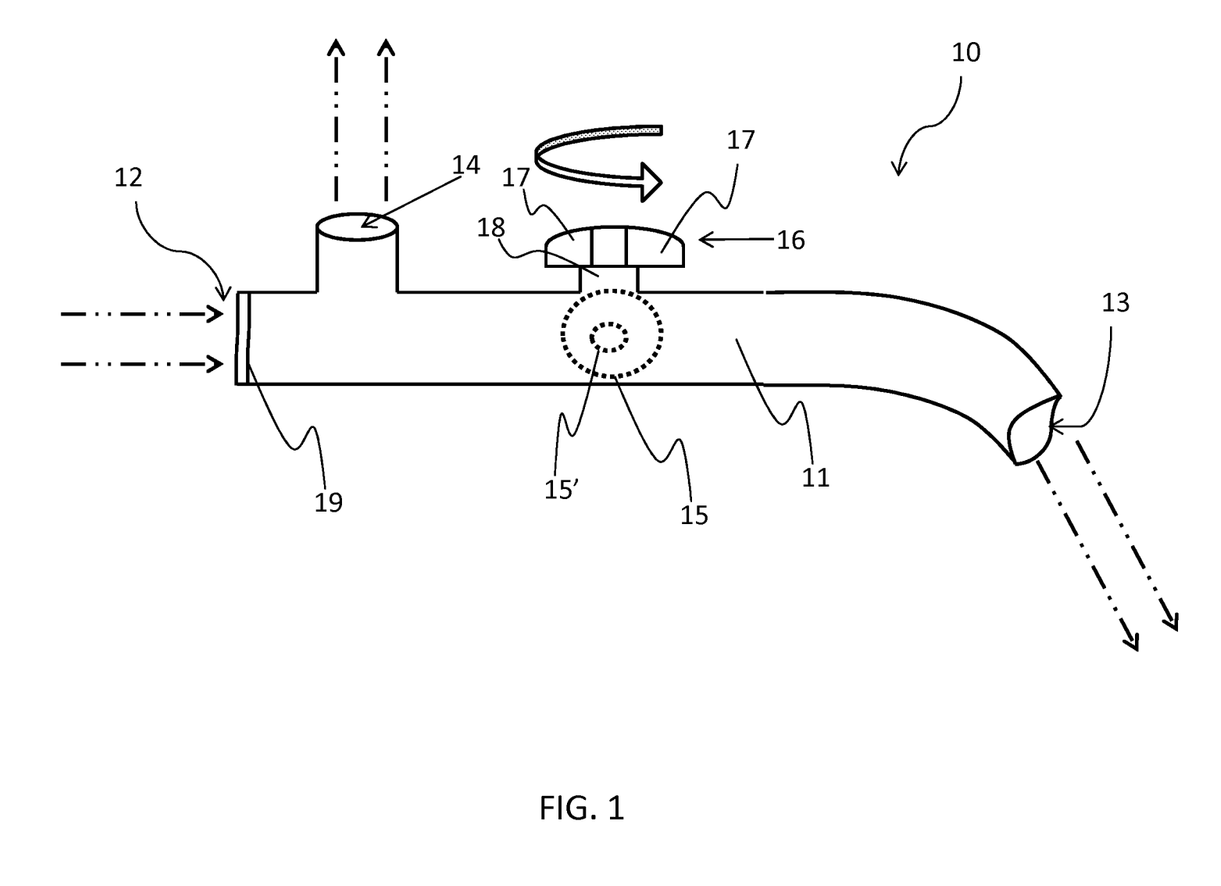
FIG. 1 illustrates an example attachment apparatus according to the present disclosure.
Figure 2:
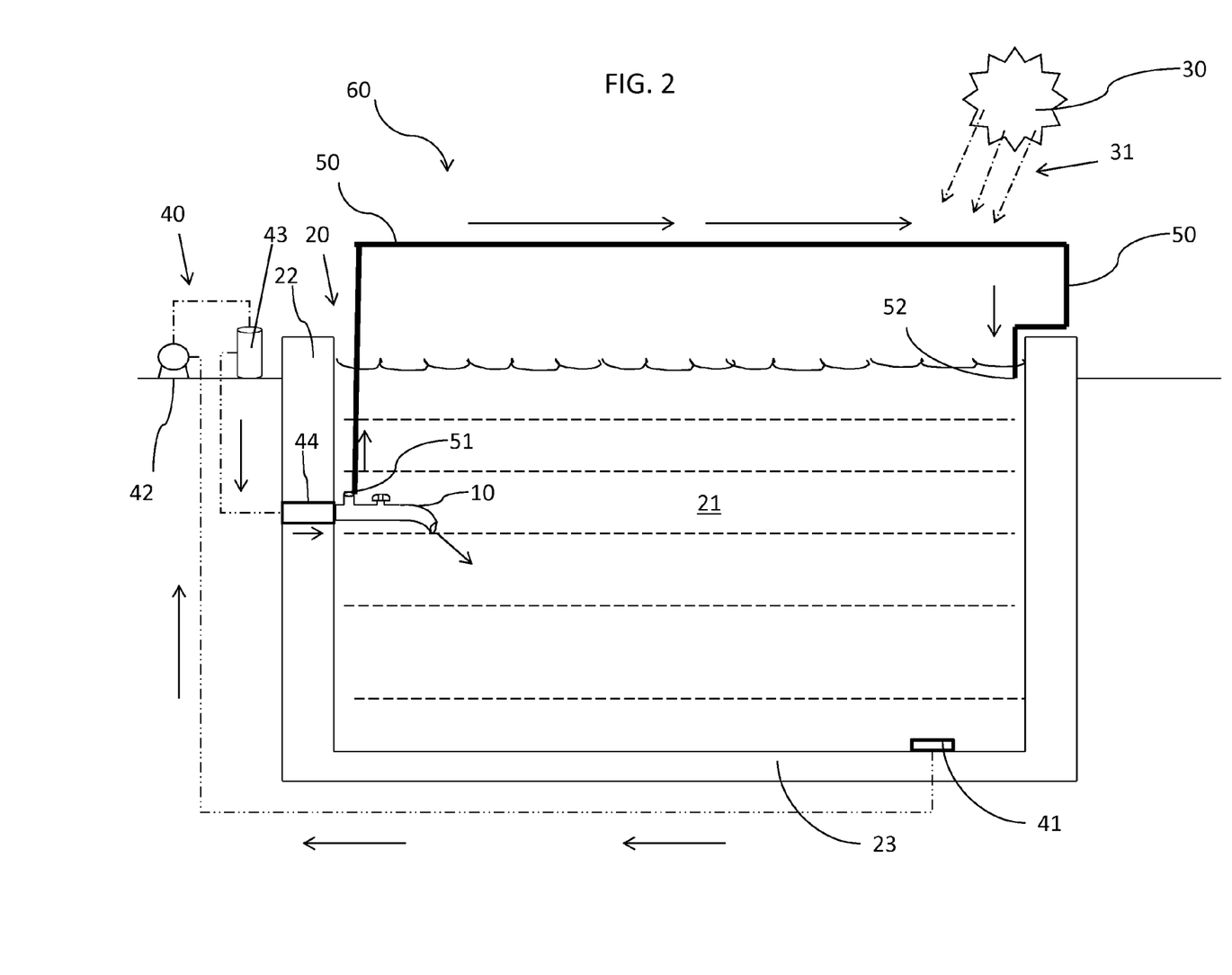
FIG. 2 illustrates an example system according to the present disclosure.

Referring to FIGS. 1-2, an example of an attachment apparatus 10 and system 60 are illustrated according to the present disclosure. Attachment 10 defines an elongated body 11 extending between a first opening 12 and a second opening 13. The second opening 13 is formed at or adjacent to an opposite end of the first opening 12. In this example, the second opening 13 defines an angled flow trajectory with respect to the direction of the elongated body. Accordingly, fluid enters attachment 10 through the first opening 12 and exits through the second opening 13. The elongated body 11 defines a substantially unrestricted flow channel therethrough from the first opening 12 to the second opening 13.

A third opening 14 is formed on the elongated body 11 allowing fluid to flow out of attachment 10 in a different direction with respect to second opening 13. In this example, third opening 14 is formed in a substantially perpendicular relationship with respect to the general flow direction of body 11. It is understood that the third opening 14 can be formed to direct flow in any transverse direction with respect to the flow channel of attachment 10. The direction of the third opening 14 should be formed to cooperate with a pump requirement suitable to direct the fluid a suitable distance out of the pool to absorb thermal energy prior to reentry into the pool as shown schematically in FIG. 2.

A diverging valve is provided within attachment 10 adapted to redirect the fluid as it passes through the flow channel of body 11. A diverging valve 15, illustrated in dashed lines to show that the valve is internal to the body 11, can be used that includes a movable flow splitter member positioned within the flow channel of body 11 and coupled to a movable turn knob 16. The diverging valve can be any suitable valve operable to allow flow in one direction when aligned with the opening of the flow channel and restrict flow when the valve is positioned to restrict flow thus causing a redirection or a back pressure to the flow directing the fluid in another direction. In an example, the flow splitter is a ball valve 15, that includes an opening 15' through its center that is aligned with the flow direction of body 11 when open and partially or fully blocks flow when the ball valve is turned.

In this example, turn knob 16 includes opposed wing grip elements 17 formed around a center axle 18 for turning the internal flow splitter. Wing elements 17 are substantially aligned and can be manually adjustable to rotate the flow splitter of the internal valve. When turn knob 16 is in an open position, wing elements 17 are generally parallel with the flow direction of the flow channel of body 11. In this configuration, the flow splitter is substantially non-intrusive to the fluid flow through body 11. Accordingly, with substantially no obstruction, fluid flowing through body 11 will naturally exit second opening 13 and back into the pool body 21. When turn knob 16 is rotated, i.e., turning wing elements 17 into an angled relationship with respect to the flow direction of body 11, then the flow splitter forms a fluid flow obstruction or resistance causing the fluid to at least partially exit through third opening 14. The dashed arrows of FIGS. 1 and 2 schematically represent the general direction of fluid flow entering and exiting attachment 10 and through system 60.

The amount of suitable rotation of turn knob 16 to create the desired fluid redirection is adjustable depending on the heating and pump demand needed to heat the water to a desired temperature. In certain situations, full closure of the valve causing most or all of the fluid to exit through opening 14 is too aggressive for desired heating causing too much fluid to pass through system 60 while failing to absorb enough heat. Accordingly, a user can make the appropriate adjustment through basic system testing for a particular pump and pool system. In another example, a user may desire full closure of the valve and redirection of the water. Such examples can include if the redirection is meant for a fountain or another use rather than redirecting the fluid to be heated.

In this example, system 60 is shown in cooperation with a swimming pool 20. Swimming pool 20 holds a body of water 21 within at least one retaining wall 22 and a floor 23. A filtering system 40 includes a fluid drawing mechanism 41 mounted on floor 23 adapted to draw pool water 21 from pool 20. The fluid drawing mechanism 41 can be located at various positions within the pool 20 including any retaining wall 22 or floor 23. A pump 42 (illustrated schematically) is utilized to drive the pool water through a filter 43 and then back into pool 20 through a return opening 44 formed through retaining wall 22. Filter 43 is adapted to substantially "clean" the pool water and remove undesired contaminants and particles. Although this example illustrates a filter 43, it is contemplated and within the scope of this disclosure that fluid can be delivered with use of a pump absent a filter. For example, device 10 can be used in cooperation with a pump to drive water in an upward direction to be used in a fountain or a spraying fashion. Other entertaining fluid redirecting uses are within the scope of the present disclosure. Filtering system 40 can operate continuously, according to a preset schedule, or combinations thereof to ensure a desired amount of fluid filtering of pool 20. Filtering systems are generally desirable for any body of water or reservoir to prevent undesired accumulation of contaminants or growths of certain organisms. The flow path of filtering system 40 is illustrated schematically in dotted lines along with arrows to show direction of flow.

In this example, attachment apparatus 10 is coupled to return opening 44 to receive filtered pool water from filtering system 40. Attachment 10 can be connected to return opening 44, which is submerged underwater. In an example, attachment 10 can include a threaded portion 19 adapted to engage and mount to a mating threaded portion formed within return opening 44. A tube system 50 having at least one tube 50 is coupled to attachment 10 through the third opening 14. The attachment of tube 50 and opening 14 can be accomplished through mating threaded portions formed on the tube and the opening. Tube 50 includes a proximal end 51 connected to third opening 14 and a distal end 52 having an opening to allow heated pool water to reenter pool 20. A flow channel is formed therebetween. Tube 50 is positioned to be exposed to environmental conditions. Tube 50 extends external to the body of water 21, typically lying on the ground or surface to be exposed to external conditions such as sunlight. Using the diverging valve, fluid flowing into attachment 10 can be at least partially redirected through third opening 14 and into tube 50.

Tube 50 is generally exposed to environmental conditions. In this example, exposure to environmental conditions includes exposure to sun 30 and solar radiation 31. Solar radiation 31 provides thermal energy to the surface of tube 50 thereby heating tube 50. Tube 50 can be constructed of a thermally conductive material that allows for heat transfer to the fluid. Accordingly, fluid entering tube 50 at proximal end 51 is heated before reentering pool 20 at distal end 52 through heat transfer from the heated material of tube 50 to the fluid passing through the flow channel. Tube 50 can be a standard garden hose or any flexible material adapted to absorb heat from an external source. In an example, tube 50 can be split into a plurality of tubes prior to reentry into pool 20. Pump 42 should be sized and constructed to drive the fluid through the extended distance of tube 50. Adjustment of the internal valve of apparatus 10 controls the volumetric flow rate of water that is redirected into tube 50. The valve of apparatus 50 should be adjustable to provide varying degrees of redirection ability for the water passing through tube 50. This adjustment controls the amount of water to be heated and then reentered back into the pool.

Tube 50 can be sized and shaped according to a particular pool size and customized to a user's preferences for appearance in cooperation with the pool location. For example, tube 50 can lie on a surface surrounding pool 20 mounted within a channel formed around pool 20 to receive tube 50. Variations to accommodate aesthetic appeal can be constructed to cooperate with the external tube pathway. In a further example, tube 50 is concealed from plain view and connected to a solar panel system adapted to receive solar radiation and transfer heat to tube 50.

System 60 can be constructed to allow for heating of a body of water. This is particularly useful at the start of a swimming season when water temperatures are initially low with respect to a comfortable setting. In an example, the average temperature of the body of water 21 can be raised as a result of system 60 ranging from about 10 degrees to about 50 degrees Fahrenheit. In a further example, the temperature can be raised from about 20 degrees to 50 degrees Fahrenheit. Depending on the quantity of the solar energy and absorption efficiency, system 60 can raise the temperature of the water in a range from 20 to 40 degrees Fahrenheit in a time range from about 24 to 96 hours and more particularly between about 48 and 72 hours. Another determining factor is the volumetric flow rate of the water through the tube.

In a further example, system 60 can include a thermal sensor mounted in the body of water 21 that continuously monitors temperature. The thermal sensor can be coupled to a controller that is programmed with a preset temperature setting. The controller can be coupled to the turn knob 16 of the valve to open and close when a preset threshold has been satisfied. Accordingly, system 60 can be automated and programmable to cause activation and heating of the pool when the temperature falls below a certain threshold. When the temperature has been reached, the system can stop operating by adjusting valve 15 to an open position thus allowing the filtered pool water to reenter pool 20 directly through the second opening 13 of attachment 10.

FIGS. 3A-3F illustrate an alternative attachment apparatus 100 according to the present disclosure. Attachment 100 defines a body 111 shortened as compared to the elongated body 11 of apparatus 10. Apparatus 100 defines a shorter profile protruding a smaller distance from the retaining wall when mounted to an inlet opening of a pool. This may have a more aesthetically pleasing appeal as compared to the elongated apparatus 10. Body 111 extends between a first opening 112 and a second opening 113. The second opening 113 is formed at an opposite end of the first opening 112. First opening 112 is formed to extend into and connect with an filter system inlet, similar to apparatus 10. Threaded portion 119 is formed along an outer surface of opening 112. In this example, a plurality of securing walls 117 are formed extending from an interior surface of body 111 towards a center point forming a secondary securing hole 118 adapted to receive a locking member such as a pin or a screw. Securing walls are spaced apart equidistantly from each other and define a relatively thin profile to prevent flow obstruction through body 111. Accordingly, fluid enters attachment 100 through the first opening 112 and exits through the second opening 113. The body 111 defines a substantially unrestricted flow channel therethrough from the first opening 112 to the second opening 113.

Figure 3A:
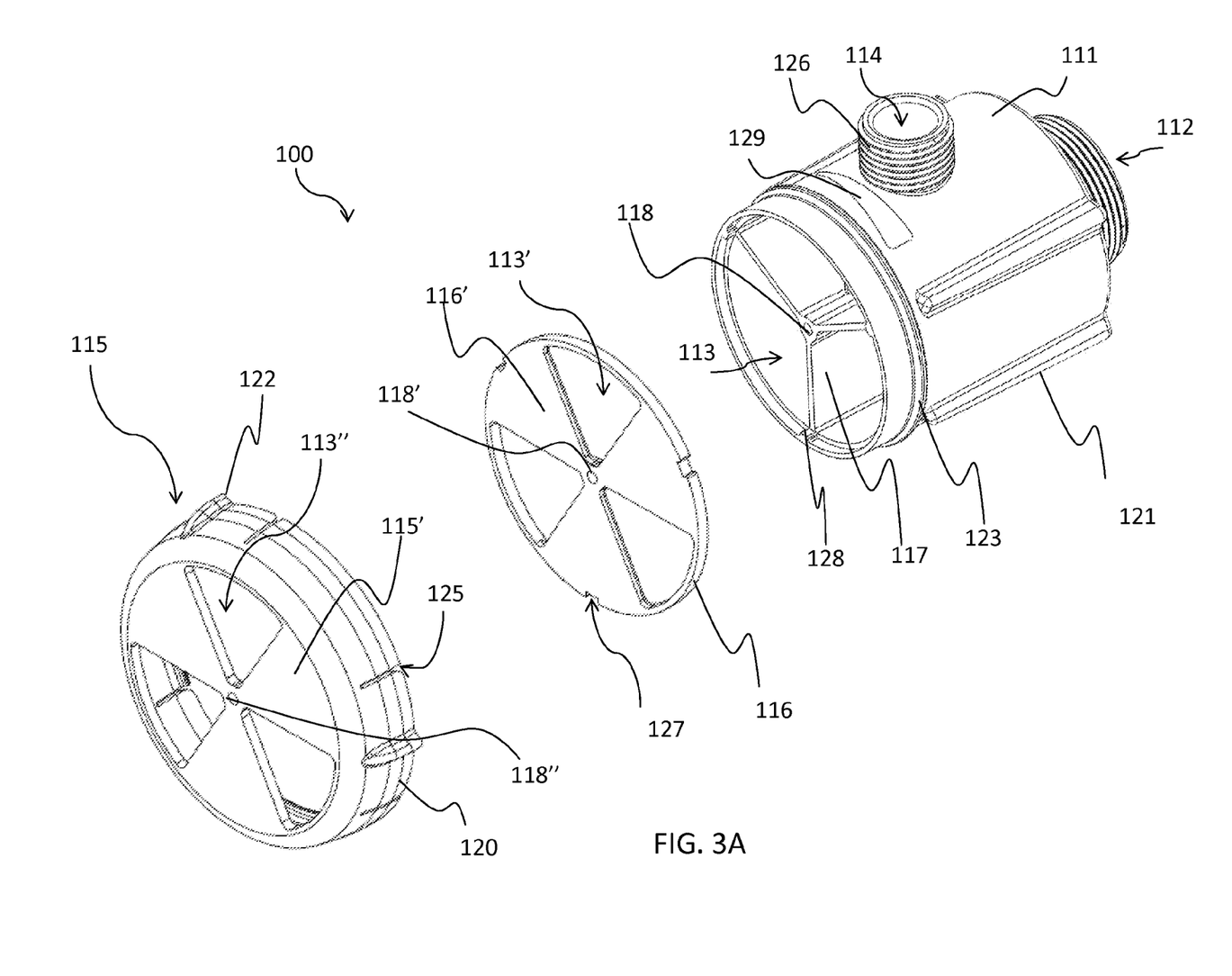
FIG. 3A illustrates an exploded view of an example attachment apparatus according to the present disclosure.
Figure 3B:
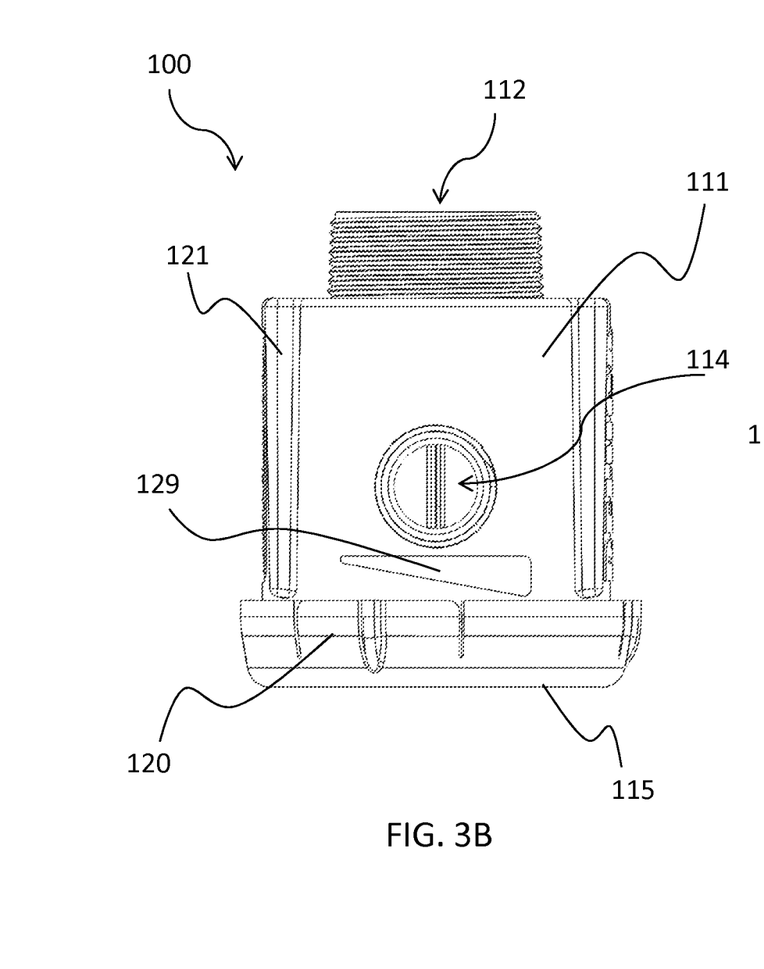
FIG. 3B is a top view of the example attachment apparatus of FIG. 3A.
Figure 3C:
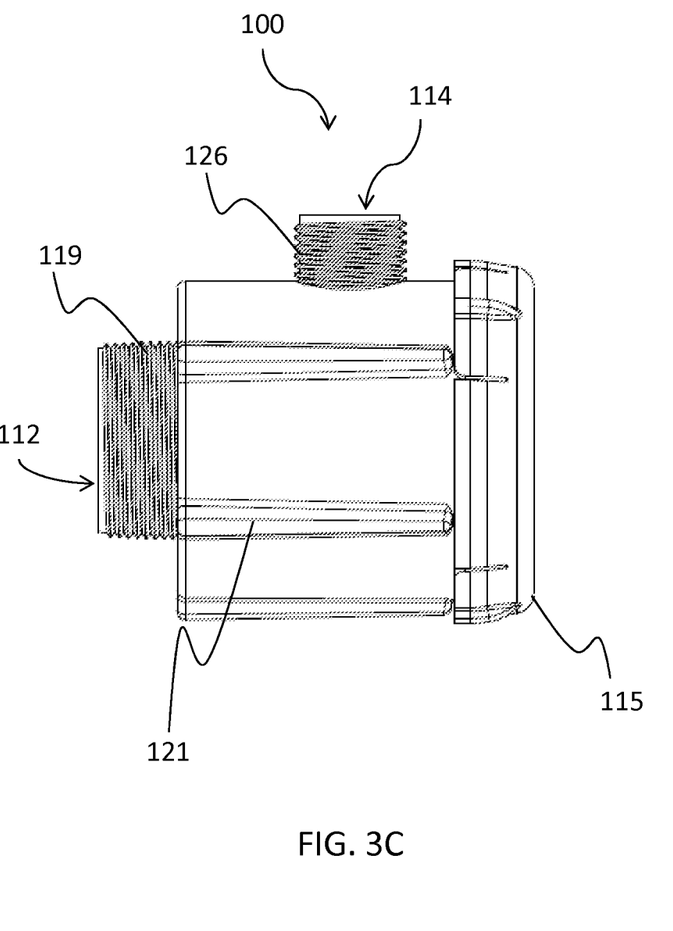
FIG. 3C illustrates a side view of the attachment apparatus of FIG. 3A.

A third opening 114 is formed on the elongated body 111 allowing fluid to flow out of attachment 100 in a different direction with respect to second opening 113. In this example, third opening 114 is formed in a substantially perpendicular relationship with respect to the general flow direction of body 111. It is understood that the third opening 114 can be formed to direct flow in any transverse direction with respect to the flow channel of attachment 100. Opening 114 extends through an extension 126 having an outer threaded portion to connect to a tube system such as corresponding threads of a garden hose. The direction of the third opening 114 should be formed to cooperate with a pump requirement suitable to direct the fluid a suitable distance out of the pool to absorb thermal energy prior to reentry into the pool as shown schematically in FIG. 2.

A diverging valve is provided to cooperate with attachment 110 and is adapted to redirect the fluid as it passes through the flow channel of body 111. In this example, the diverging valve includes a flow restrictor cap 115 functioning in cooperation with stationary plate 116. The combination of cap 115 with plate 116 when mounted to body 111 over and around the opening 113 allows for preventing or restricting fluid flow through opening 113 and thus causes a back pressure to drive the water out of opening 114.

Cap 115 includes a rim 120 sized and shaped to secure 115 over and around opening 113 of body 111. In this example, rim 120 includes a plurality of radial tabs 124 protruding inward to snap over an outer rim 123 formed circumferentially around an outer surface of the body 111. Outer rim 123 is formed adjacent or near the opening 113 and is sized and shaped to secure cap 115 to body 111. Axial slots 165 can be formed to allow some flexibility in snapping cap 115 over rim 123. Positioned in between cap 115 and body 111 is a stationary restricting plate 116. Plate 116 includes a substantially planer face 116' defining openings 113' that allow for water to flow through when mounted on body 111. A matching alignment hole 118' is defined in the center of plate 116 that corresponds with hole 118 of body 111. Similarly, a hole 118" is formed in a center of cap 115 and is also aligned with holes 118 and 118' thus allowing a screw, pin, or bolt to secure the pieces together as a secondary securing means.

Cap 115 further defines openings 113" that align with and are sized to match openings 113' of stationary plate 116. Stationary plate 116 defines indent portions 127 around its circumference that correspond to protrusions 128 formed along the inner circumferential wall of body 111. Indent portions 127 receive protrusions 128 when plate 116 is positioned within opening 113 thus creating some partial flow restriction through the openings. Cap 115 is then mounted over plate 116 to snap with rim 123. Cap 115 is rotatably mounted. When cap 115 rotates, plate 116 remains stationary. Accordingly, rotation of cap 115 causes flow restriction through body 111 and redirects water through 114. It is further contemplated to provide a threaded connection between cap 115 and body 111 such that the face of cap 115 is rotatable.

Figure 3D:
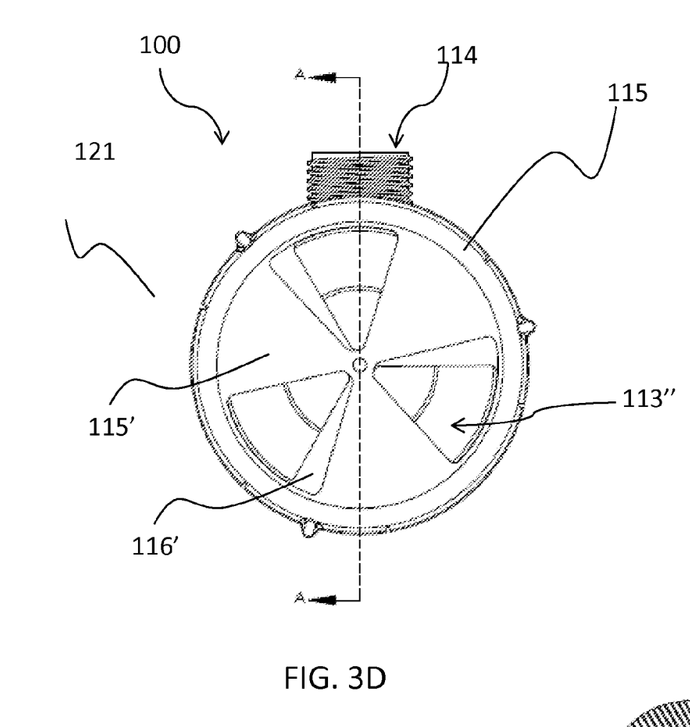
FIG. 3D illustrates a front face view of the attachment apparatus of FIG. 3A.
Figure 3E:
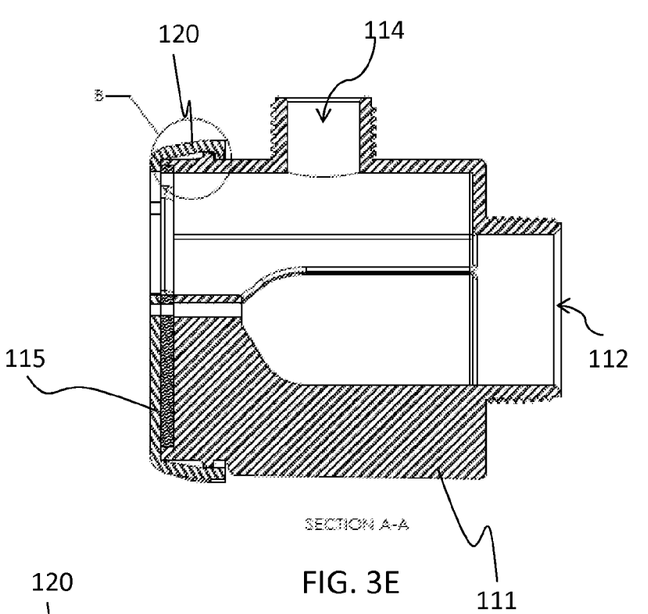
FIG. 3E illustrates a cross-section side view across plane A-A from FIG. 3D.
Figure 3F:
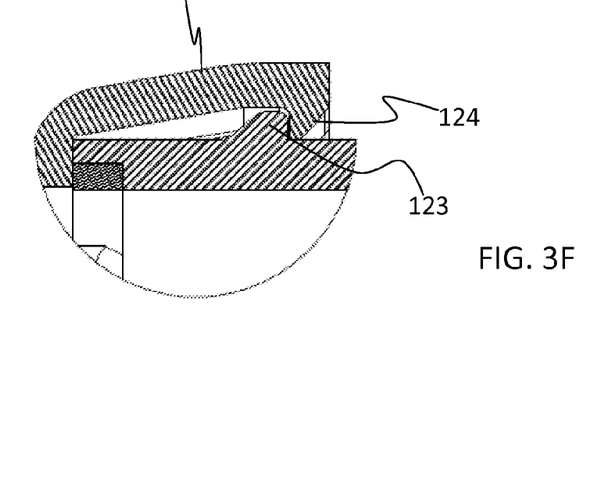
FIG. 3F illustrates a magnified view of portion B from FIG. 3E.

In a fully opened configuration, openings 113" of cap 115 are aligned with openings 113' of plate 116 and such a configuration substantially allows all of the water flowing through apparatus 100 to exit directly into the pool. In an open configuration, minimal, if any, water is redirected into opening 114. By turning cap 115 in a clockwise or counterclockwise direction, a wall restricting portion 115' of cap 115 partially blocks the opening 113' causing back pressure inside apparatus 100 and thus redirecting the fluid flow out through opening 114. This configuration is shown in FIG. 3D. Various configurations are available by turning cap 115 to varying degrees from fully open to fully closed. This varies the amount of water to be redirected out of the pool to be heated through system 60 as shown in FIG. 2. In these examples, each of cap 115 and plate 116 define three "pie-shaped" openings 113' and 113".

In an example, cap 115 includes axially protruding alignment fins 122 that can align with alignment fins 121 formed on body 111. The alignment fins can be provided to for aesthetic purposes and to indicate to a user of apparatus whether cap 115 is in an open or closed configuration. In a further example, a flow indicator 129 can be provided as an indicia of whether the system is open or closed. Indicator 129 can be provided adjacent opening 114 and viewable from above by a user. The indicia 129 can be aligned with at least one fin 122 to show a degree of openness of cap 115 as cap 115 is rotated. Indicator 129 can be painted or manufactured integral with body 111 during a molding process.

The apparatus of the present disclosure should be fabricated from a sufficient material, such as plastic or composite plastic to withstand the chemical environment of a swimming pool. The attachment apparatus can be fabricated through a molding process and should at least be capable of surviving extended exposure to chlorinated water. It is further contemplated that certain parts of apparatus can be fabricated independently and separately to be combined or assembled for use.

Many modifications and variations of the present disclosure are possible in light of the above teachings. Therefore, within the scope of the appended claim, the present disclosure may be practiced other than as specifically described.

What is claimed is:

1. A system for heating water from a swimming pool of the type having a pool of water and a pump pumping a flow of water through an inlet into the pool of water, the system for heating water comprising:
    (a) an attachment apparatus having a main body defining a fluid passageway from a first opening to a second opening and a third opening, the attachment apparatus further having a connecting portion with the first opening defined therethrough, the connecting portion connecting to the inlet for receiving a flow of water through the first opening;

(b) an adjustable diverging mechanism mounted to the attachment apparatus, the adjustable diverging mechanism operable to selectively direct a portion of the flow from the first opening to the third opening, the diverging mechanism includes an adjustable flow restrictor cap mounted over the second opening having a stationary plate provided between the second opening and the restrictor cap; and (c) a tube having a flow channel and a thermally conductive outer surface, the tube coupled to the third opening and extending out of the pool of water and exposed to environmental conditions to absorb thermal energy and be heated;

wherein the portion of the flow of water directed to the third opening is heated when passing through the flow channel of the tube and then returned to the pool of water; and wherein the flow through the flow channel is provided only by the pump of the swimming pool.

2. The system of claim 1 wherein the third opening in the main body of the attachment apparatus is disposed between the first and second openings.

3. The system of claim 1 wherein the tube is fabricated from a member selected from the group consisting of a flexible polymer or rubber-based tube.

4. The system of claim 1 wherein the tube is a garden hose.

5. The system of claim 1 wherein the thermal energy includes solar radiation.

6. The system of claim 1 wherein the system is operable to increasing the temperature of the pool of water between about 10 degrees and 50 degrees Fahrenheit.

7. The system of claim 1 wherein the system is operable to increase the temperature of the pool of water between about 20 degrees and 40 degrees Fahrenheit in a time between about 48 and 96 hours.

8. The system of claim 1 wherein activating the diverging mechanism is automated and responsive to a thermal sensor wherein the diverging mechanism will open or close if the pool of water reaches or drops below a predetermined temperature.

9. The system of claim 1 wherein the inlet is coupled to a fluid filtering system adapted to draw the water from the pool of water with the pump, filter the water by substantially removing contaminants and undesired items found in the water and delivering the filtered water back to the pool of water through the inlet.

10. The system of claim 1 wherein the restrictor cap and the stationary plate each define at least one aligned opening to allow water to flow out of the attachment apparatus and wall restriction portions that restrict water from exiting the second opening.

11. The system of claim 10 wherein the restrictor cap is adjustable to restrict water flow out of the second opening when rotated to block the openings formed in each of the restrictor cap and the stationary plate causing a back pressure to redirect the water out through the third opening.

12. The system of claim 11 wherein the body of the apparatus includes a flow restriction indicator provided on an outer surface of the apparatus body and cooperating with a flow indicator fin formed on an outer surface of the cap.

13. A system in accordance with claim 1, wherein the connection portion of the attachment apparatus is a threaded portion for threaded attachment to the inlet.

14. A system for heating water from a swimming pool of the type having a pool of water and a pump pumping a flow of water through an inlet into the pool of water, the system for heating water comprising:

(a) an attachment apparatus having a main body defining a fluid passageway from a first opening to a second opening, and a third opening, the attachment apparatus further having a connecting portion with the first opening defined therethrough, the connecting portion connecting to the inlet for receiving a flow of water through the first opening;

(b) an adjustable diverging mechanism mounted to the attachment apparatus, the adjustable diverging mechanism operable to selectively direct a portion of the flow from the first opening to the third opening, the diverging mechanism comprising an adjustable flow restrictor cap disposed over the second opening so as to selectively cause backpressure in the main body and direct flow out the third opening; and (c) a tube having a flow channel and a thermally conductive outer surface, the tube coupled to the third opening and extending out of the pool of water and exposed to environmental conditions to absorb thermal energy and be heated;

wherein the portion of the flow of water directed to the third opening is heated when passing through the flow channel of the tube and then returned to the pool of water; and wherein the flow through the flow channel is provided only by the pump of the swimming pool.

15. A method of heating a swimming pool of the type having a pool of water and a pump pumping a flow of water through an inlet into the pool of water, the method comprising the steps of:

(a) providing the system in accordance with claim 14;

(b) connecting the first opening of the attachment apparatus to an inlet of the pool of water for receiving a flow of water from the pump;

(c) connecting the tube defining the fluid passageway to the third opening, the tube having a thermally conductive outer surface and extending out of the pool of water to be exposed to environmental conditions to absorb thermal energy and be heated;

(d) adjusting the diverging mechanism to divert a portion of the flow through the third opening and the tube to absorb heat from the heated tube, the flow through the tube being provided only by the pump of the swimming pool; and (e) redirecting the heated water back into the pool of water.

16. The system in accordance with claim 14, wherein the third opening in the main body of the attachment apparatus is disposed between the first and second openings.

17. The system in accordance with claim 14, wherein activating the diverging mechanism is automated and responsive to a thermal sensor wherein the diverging mechanism will open or close if the pool of water reaches or drops below a predetermined temperature.

18. The system in accordance with claim 14, wherein the inlet is coupled to a fluid filtering system adapted to draw the water from the pool of water with the pump, filter the water by substantially removing contaminants and undesired items found in the water and delivering the filtered water back to the pool of water through the inlet.

19. The system in accordance with claim 14, wherein the body of the apparatus includes a flow restriction indicator provided on an outer surface of the apparatus body and cooperating with a flow indicator fin formed on an outer surface of the cap.

* * * * *